United States Patent [19]

Valyi

[11] Patent Number: 5,599,598
[45] Date of Patent: Feb. 4, 1997

[54] MULTILAYERED HOLLOW PLASTIC ARTICLE AND METHOD FOR OBTAINING SAME

[75] Inventor: Emery I. Valyi, Katonah, N.Y.

[73] Assignee: Husky Injection Molding Systems Ltd., Canada

[21] Appl. No.: 415,350

[22] Filed: Apr. 3, 1995

[51] Int. Cl.$^6$ ..................................... B29D 9/00
[52] U.S. Cl. .................. 428/35.7; 428/36.6; 428/542.8; 428/480; 428/483; 220/453; 220/454; 220/458; 215/12.2; 264/513; 264/551; 264/250; 264/273
[58] Field of Search ................. 428/35.7, 36.6, 428/36.7, 36.91, 480, 483, 520, 542.8; 220/410, 453, 454, 458, 461; 215/12.1, 12.2, 40; 264/513, 515, 516, 273, 275, 259, 544, 550, 551, 250, 279

[56] References Cited

U.S. PATENT DOCUMENTS

| | | | |
|---|---|---|---|
| 3,717,544 | 9/1970 | Valyi | 220/453 |
| 3,929,954 | 12/1975 | Valyi | 264/513 |
| 3,954,923 | 5/1976 | Valyi | 264/513 |
| 3,955,697 | 5/1976 | Valyi | 264/513 |
| 4,107,362 | 8/1978 | Valyi | 264/513 |
| 4,289,817 | 9/1981 | Valyi | 264/513 |
| 4,391,861 | 7/1983 | Nilsson | 428/542.8 |
| 4,483,891 | 11/1984 | Cerny | 428/542.8 |
| 4,534,995 | 8/1985 | Pocock et al. | 427/38 |
| 4,535,901 | 8/1985 | Okudaira et al. | 215/12.2 |
| 4,646,925 | 5/1987 | Nohara | 428/542.8 |
| 4,868,026 | 9/1989 | Shimizu et al. | 428/36.7 |
| 4,923,723 | 5/1990 | Collette et al. | 428/542.8 |
| 4,994,313 | 2/1991 | Shimizu et al. | 428/542.8 |
| 5,221,507 | 6/1993 | Beck et al. | 264/513 |
| 5,344,045 | 9/1994 | Richter et al. | 220/461 |
| 5,401,457 | 3/1995 | Valyi | 264/513 |
| 5,433,347 | 7/1995 | Richter et al. | 222/105 |
| 5,443,766 | 8/1995 | Slat et al. | 264/37 |
| 5,443,767 | 8/1995 | Cahill | 264/513 |

FOREIGN PATENT DOCUMENTS

| | | | |
|---|---|---|---|
| 1000138 | 1/1986 | Japan | 428/36.7 |
| 2028333 | 2/1987 | Japan | 428/36.6 |
| 2091629 | 8/1982 | United Kingdom | 215/12.1 |
| WO93/07068 | 4/1993 | WIPO | 220/454 |

*Primary Examiner*—Charles Nold
*Assistant Examiner*—Chris S. Kyriakou
*Attorney, Agent, or Firm*—Bachman & LaPointe, P.C.

[57] ABSTRACT

The present invention relates to a multilayered hollow plastic article having an inner first portion of thermoplastic material and an outer second portion of pressure molded thermoplastic material. The second portion of thermoplastic material extends from the closed bottom of the article to the open neck of the article, and the first portion of thermoplastic material extends from the closed bottom to below the neck region of the article. The present invention also relates to the method for preparing said article.

24 Claims, 4 Drawing Sheets

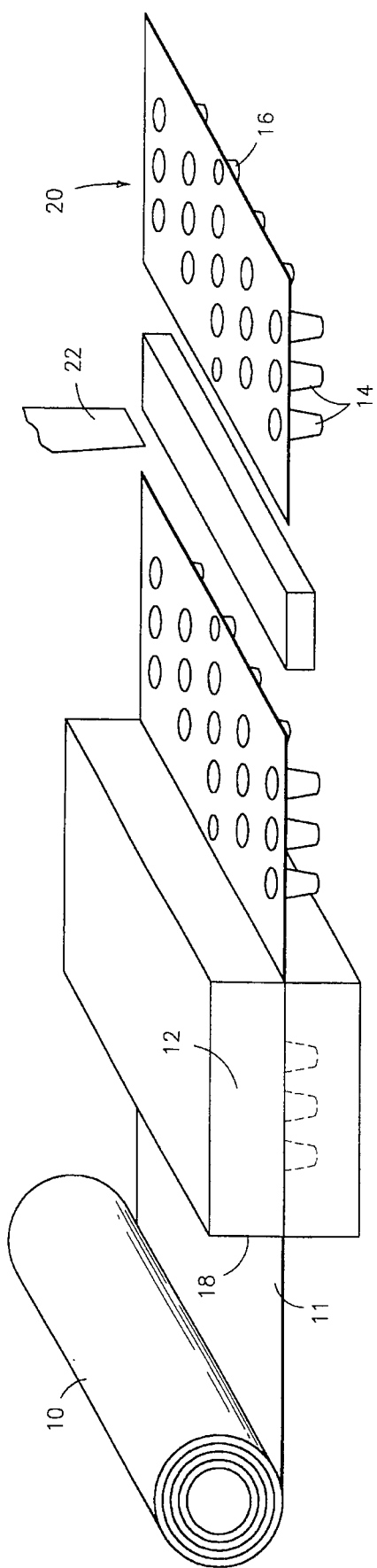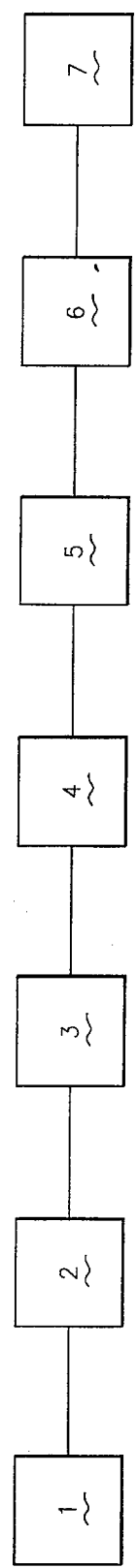

MULTILAYERED HOLLOW PLASTIC ARTICLE AND METHOD FOR OBTAINING SAME

BACKGROUND OF THE INVENTION

The present invention resides in a multilayered hollow plastic article and method for obtaining same wherein the article may have two, three or more layers.

Multilayered hollow plastic articles are well known in the art wherein the article includes an inside film-like thermoplastic material and an outside pressure molded thermoplastic material. For example, thin-formed liners were heretofore made as by vacuum forming from a sheet of thermoplastic material to cover the entire inside surface of the preform and indeed to overlap the rim. The outside structural portion of the multilayered article is formed as by injection molding. Reference should be had to U.S. Pat. No. 3,717,544 to Valyi which discloses a method and apparatus for making lined plastic containers in which a liner is placed over a blow core, a plastic material is injected around the blow core and liner in an injection mold and the injected material together with the liner is blown in a blow mold. In accordance with the procedure of the '544 patent, the liners may be preformed and inserted over the blow core before the blow core is placed in the injection mold.

Different materials are used for the liner and the injected portion, respectively, in order to provide a combination of properties in the finished product that a single plastic lacks, for example, permeation resistance to fluids and strength, at modest cost. Typically, permeation resistant plastics, such as PEN, EVOH and PVDC, and others, are too expensive for packaging containers if used as a single layer.

Thus, the liner material may be made of a barrier material such as polyethylene naphthalate (PEN) or other barrier material, and the outside may be made of a less expensive thermoplastic material such as polyethylene terephthalate (PET). Naturally, the expensive inside barrier material is considerably thinner than the less expensive outside thermoplastic material, typically less than ten percent (10%) of the total thickness.

However, it is not necessary to extend the expensive barrier material all the way to the rim of the multilayered article because this represents a waste of material as the neck of the multilayered article is generally too thick to transmit gas, and so is part of the shoulder. Also, the shorter the liner or sleeve, the better its L/D ratio and the easier and more economical it is to thermoform same because the skeleton scrap is reduced with decreasing depth of the draw.

In addition, application of liners in multicavity preform molds is generally one at a time and generally involves liners which extend all the way to the rim of the desired multilayered article. In general practice, the liners are thermoformed, trim-cut from a web, and transferred one at a time to the injection mold.

U.S. Pat. No. 3,954,923 to Valyi forms a multilayered liner material on a web wherein the liner extends to the rim of the desired multilayered article. Although the liners may be transferred to the injection molds on the web, the liners are made to cover the entire inside surface.

It is therefore a principal object of the present invention to provide an improved multilayered hollow plastic article and a method for obtaining same.

It is a further object of the present invention to provide an improved multilayered hollow plastic article wherein the inside layer terminates below the neck portion of the article.

It is a still further object of the present invention to provide an article and method which is economical and which represents significant savings of material in practice with desirable resultant properties.

Further objects and advantages of the present invention will appear hereinbelow.

SUMMARY OF THE INVENTION

In accordance with the present invention, the foregoing objects and advantages are readily obtained.

The multilayered hollow plastic article of the present invention comprises: an inner first portion of a film-like thermoplastic layer; an outer second portion of a pressure molded thermoplastic layer contacting the first portion, with the two layers being adhered to each other substantially over their entire contacting areas; wherein said article has a first end defined by a neck region with an opening therein at the terminus thereof, a second end defined by a bottom region which is closed at the terminus thereof, and an intermediate body region between the neck and bottom regions, with the body region connected to the neck region; and wherein the second portion covers the closed bottom and extends from the closed bottom to the open neck, and the first portion covers the closed bottom and extends from the closed bottom to terminate below the neck portion and generally extends to the connection between the body and neck portions. In a preferred embodiment, the second portion is the major component and is a thermoplastic material such as polyethylene terephthalate, and the first portion may be multilayered and includes a barrier material such as PVDC or polyethylene naphthalate (PEN) as one of the layers. Desirably, the article has a threaded neck region and may be a blow molded article.

The article has an inside and an outside face, with the first portion defining the inside face of the body and bottom regions, and the second portion defining the outside face of the body and bottom regions, and wherein the second portion defines the inside and outside faces of the neck region. Preferably, the first portion includes a plurality of discrete, residues of the material of the first portion, as strips, separated by material of the second portion, said residues being between the inside and outside faces of the article, as the strips extending from the inside face of the article to the outside face of the article over the second portion below the neck region and generally at the connection between the body and neck regions.

The present invention also comprises a method of making a multilayered hollow plastic article having an inside and outside face, a first end defined by a neck region with an opening therein at the terminus thereof, a second end defined by a bottom region which is closed at the terminus thereof, and an intermediate body region between the neck and bottom regions, wherein said article is formed in a mold around and in conformity with a core, with a preformed thermoplastic sleeve provided on said core, the improvement comprising: providing a thermoplastic sleeve of a first portion of thermoplastic material connected to a plate of said material, as by a plurality of discrete residual strips of said first material, with spaces between said strips; placing said sleeve connected to said web in an injection mold; and injecting a second portion of thermoplastic material into the injection mold so that the injected second portion forms the outside face of the bottom and body regions of the multilayered article, with the sleeve forming the inside face of the bottom and intermediate body regions, and with the injected material passing through said spaces to form the inside and outside faces of the neck region of the article. In the preferred embodiment, the injection mold severs the sleeve from the web.

In a further preferred embodiment, a plurality of said sleeves are formed on a web and the web is divided into plates, and the plates transferred with the sleeves thereon to a plurality of injection mold cavities for the formation of a plurality of the multilayered articles. Also, desirably the multilayered article thus formed is transferred to a blow mold for the formation of an expanded or blown multilayered article.

The present invention also includes the step of providing alignment means on the web adapted to position the web with respect to a plurality of injection mold cavities. In addition, the present invention also includes the step of providing means on the plate to facilitate destacking of a plurality of said plates, with the alignment means desirably coacting with the destacking means.

BRIEF DESCRIPTION OF THE DRAWINGS

The present invention will be more readily understandable from a consideration of the following illustrative drawings which represent preferred embodiments wherein:

FIG. 1 schematically shows operative steps of the present invention;

FIG. 2 shows the formation of thermoformed liners on a web;

DETAILED DESCRIPTION OF PREFERRED EMBODIMENTS

Figure 3:
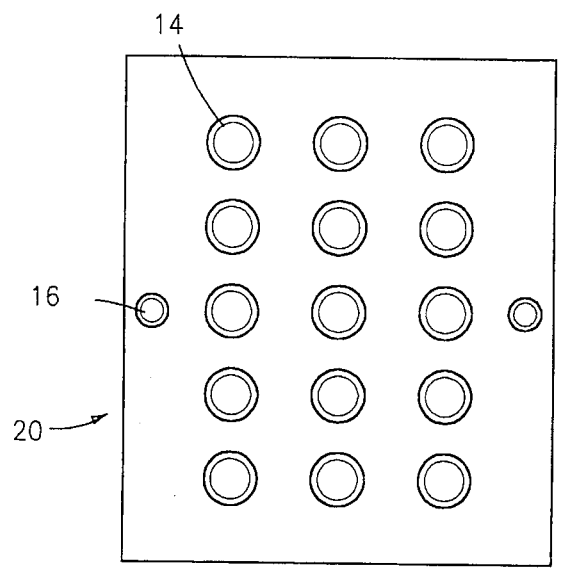
FIG. 3 shows a top view of a web including thermoformed liners.

In the formation of multilayered hollow plastic articles using an inner first portion of a film-like or thin-walled thermoplastic material, as for example, a drawn liner, and an outer second portion of a pressure molded or injection molded thermoplastic material, the inner first portion or liner was previously made to cover the entire inside surface of the article and indeed in many instances to overlap the rim. However, it is not necessary to make the liner of such extent since it wastes the normally more expensive liner material because the neck is too thick to transmit gas, and so is part of the shoulder. Also, the shorter the liner the more economical it is to prepare same by thermoforming because the shorter the liner, i.e., the depth to which it is drawn from a web, the less the unused part of the web, called the skeleton scrap. In addition, it is highly desirable to prepare the liners from a web and to use at least a portion of the web to transport the liners and to locate them in registry with the injection mold.

Thus, in accordance with the present invention liners are thermoformed on a web according to the same pattern as mold impressions of the injection or preform mold. The liners are not punched out, but rather the liners remain at least partially attached to the web and the web is configured to match the injection or preform mold face. Preferably, alignment means are molded or formed into the web so that the web can be accurately positioned with respect to the mold face and cavities, as by the use of locating pins in the mold face to correspond to the alignment means in the web. The mold face is provided with a suitable recess so that the web can be placed upon it without interfering with mold closing. In addition, means are provided in the web to facilitate destacking of a plurality of webs in a convenient and easy manner.

The steps of the present invention are shown in FIG. 1 wherein step 1 represents thermoforming of a plurality of liners on a web. The liners remain at least partly attached to the web and the web is cut in order to match the preform mold face to form a plate-like web portion with a plurality of liners at least partly attached thereto. Step 2 represents the cutting step where the web carrying the liners is cut into the desired plates. Step 3 represents stacking of a plurality of these plates including a plurality of liners thereon. Step 4 represents feeding or transferring the stack to a feeding means, a robot feeding an injection mold. Step 5 represents the robot feed of one of these plates to the injection mold. Step 6 represents closing the injection mold and injection molding the outer layer of thermoplastic material around the thermoformed liner. Step 7 represents opening the injection mold and removing the multilayered article.

In accordance with the details shown in FIG. 2, a web-roll 10 of thermoplastic material 11, which may have two, three or more layers of different materials, is provided adjacent thermoforming means 12. Thermoplastic material 11 is unwound and a plurality of thermoformed liners 14 are formed in the thermoforming apparatus 12. At the same time, buttons or alignment means 16 are thermoformed adjacent the outermost liners. A plate 20 is severed by cutting means 22 whereby the plate 20 is formed with a configuration corresponding to the injection or preform mold face in the injection molding mold which has dowels or the like to register with the alignment means 16. A destacking feature is preferably incorporated in the alignment means 16, for example, being a stepped rim, as is well known as a destacking means.

FIG. 3 is a top view of plate 20 with a plurality of liners 14 and alignment/destacking buttons 16 thermoformed therein. In the particular embodiment of FIG. 3, five rows of liners with three liners in each row is provided in plate 20; however, it should be understood that any desired number of liners may be thermoformed to correspond to the number of injection mold cavities. Thus, the number and spacing of the liners should correspond to the number and spacing of injection mold cavities so that a single plate 20 may be transferred directly to the injection mold resulting in a considerable savings of time and mechanical steps. In addition, plate 20 includes any appropriate alignment means such as buttons 16 or the like on the plate in order to properly align the web in the injection mold. Naturally, any desired alignment means may be chosen based on the particular features of the injection mold. The alignment means is desirably engaged by appropriate dowels or the like on the injection mold to properly position plate 20 on the injection mold face. The buttons or other alignment means can be molded in the thermoforming operation.

Figure 4:
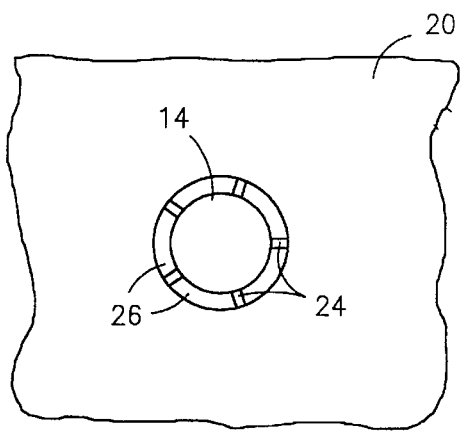
FIG. 4 is a detailed view of one thermoformed liner partially severed from the web.

In addition, liners 14 are partially severed from web 20 as clearly shown in the enlarged view of FIG. 4 wherein liners 14 are connected to plate 20 by a plurality of discrete residual strips 24 connected to plate 20 with spaces 26 between the strips. This can be done in the thermoforming apparatus 12 or in a separate operation wherein a punch (not shown) cuts out the spaces 26 leaving strips 24 flanking each cut out space so that the liners 14 remain connected to the plate by a plurality of relatively thin, residual strips of material as clearly shown in FIG. 4.

Figure 5:
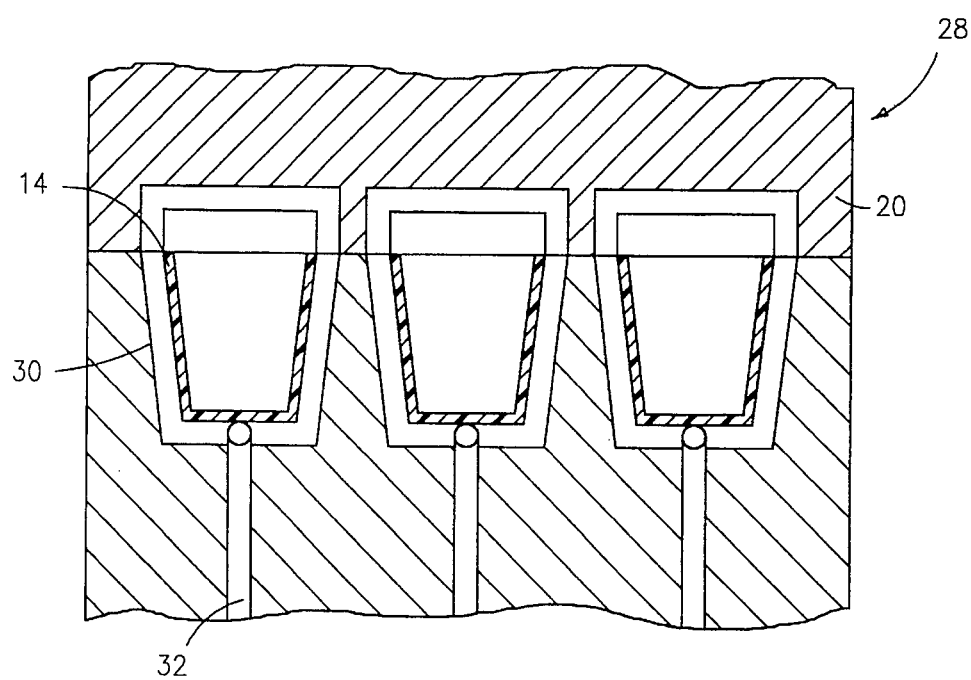
FIG. 5 is a side view of the web including liners inserted in an injection mold.
Figure 7:
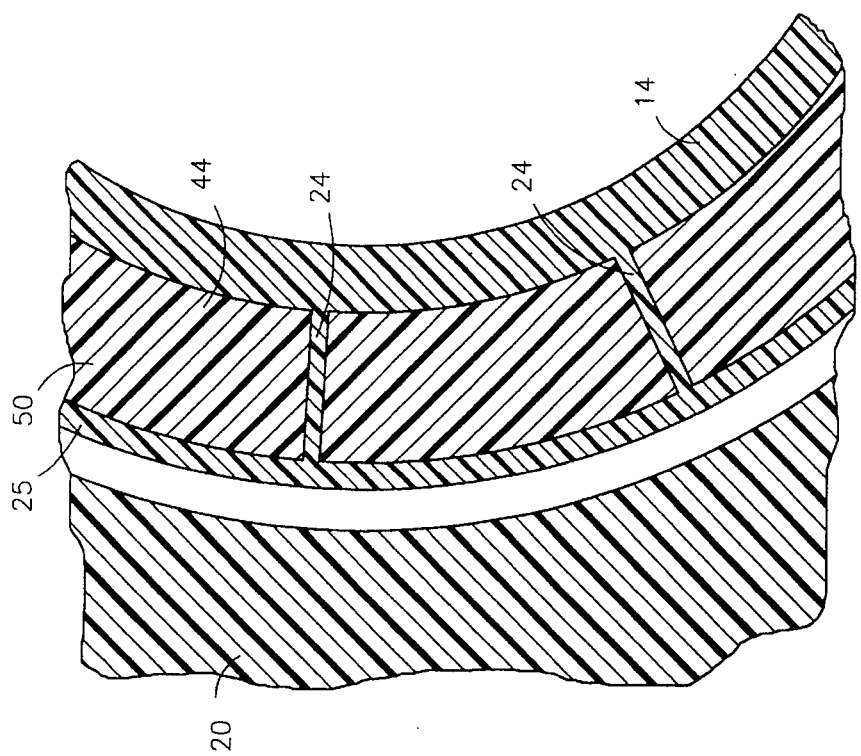
FIG. 7 is a top view along line VII—VII of FIG. 6.
Figure 6:
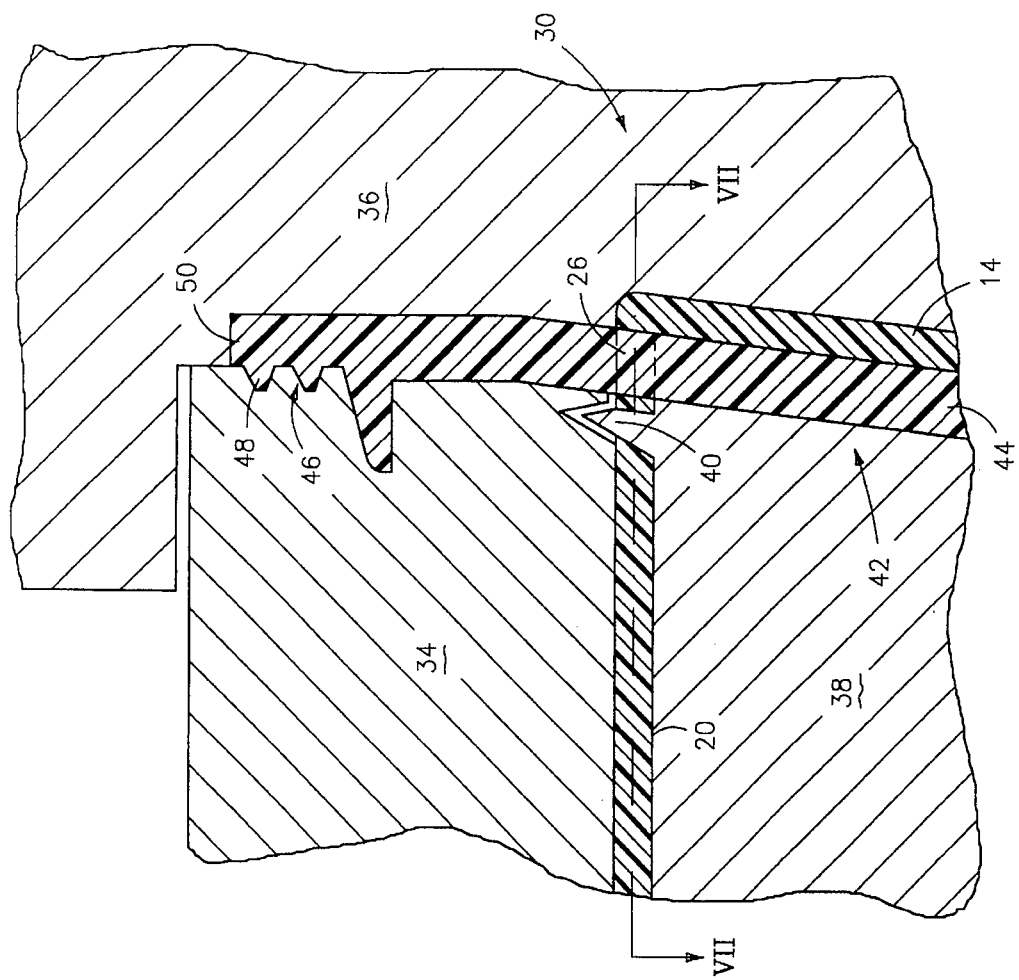
FIG. 6 is an enlarged view showing a portion of the liner plus injection molded layer in the injection mold.

The entire plate 20 is then transferred to injection mold 28 with the plurality of liners 14 attached to the plate 20 only by the plurality of discrete, residual strips 24. Moreover, alignment means 16 are used to properly position the plate 20 in the injection mold 28 and the plurality of liners 14 are appropriately configured or spaced on plate 20 in order to match the location of the molds cavities 30 in injection molding apparatus 28. As shown in FIG. 5, injection molds 28 include a plurality of individual mold cavities 30 with liners 14 positioned therein ready for injection of the outer pressure molded thermoplastic material through injection sprue 32. The details are shown in the enlarged view of FIG. 6 including neck mold 34 forming the outside surface of the neck region of the article, core 36 forming the inside surface of the neck, body and bottom regions of the article, and preform mold 38 forming the outside of the body and bottom regions of the article. The mold is shown in the closed position including cutting means 40 operating to sever liner 14 from plate 20 when the mold is closed. Thus, as shown in FIG. 6, liner 14 forms the inside surface and the injection molded thermoplastic material 44 forms both the outside surface of the body 42 and the inside and outside surfaces of the neck 46 including threaded portion 48 beneath rim 50 on the outside surface of the neck 46. In the injection molding operation, the pressure molded thermoplastic material enters the mold cavity 30 forming the outside surface of the article and passes from the body region 42 to the neck region 46 through spaces 26 between discrete, residual strips 24 of liner material, shown clearly in FIG. 4. Thus, upon closing of the mold, the cores enter the liners as the mold closes and effectively moving the neck mold with the core and cutting the liners from the plate 20 by means of cutting ring or trim ring 40. The liners are thereby severed from the plate and the residual narrow strip-like portions 24 extend over the injected thermoplastic material 44 as clearly shown in FIG. 7. The liners are thereby severed from plate 20 leaving cut portion 51 and the injection shot permits the molten plastic to flow through spaces 26 to fill the neck mold. Depending on the melting temperatures of the injected and liner materials, the residual strips 24 may at least partially melt, erode or stay in place. The cutting operation may leave residual liner material 25 (see FIG. 7) on the outside surface of the article. If cutter/trim ring 40 is omitted, the finished preforms 52 (shown in FIG. 8) remain attached to plate 20 and are removed therewith. They may then be trimmed out in a separate operation, for example, prior to insertion into the blow molding apparatus 72 shown in FIG. 9 or by an element associated with the blow molding apparatus. This may be advantageous because the plate carrying the preforms may be stacked without changing or further separate handling of the preforms. This may obviate the necessity for transferring the preforms in a loose configuration. If a linear, single stage blow system is used, sections of the plates may be fed in one at a time depending on the number of blow cavities.

Figure 8:
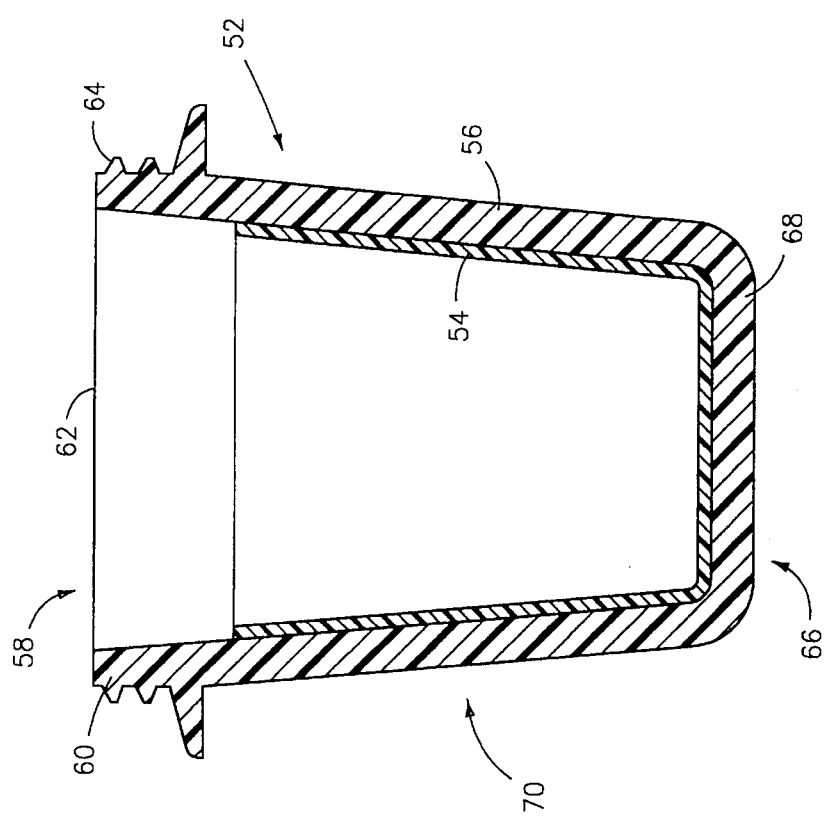
FIG. 8 is a sectional view of an injection molded multilayered article of the present invention.

Thus, referring to FIG. 8, the resultant mutlilayered product 52 includes an inner first portion 54 of film-like or drawn thermoplastic material and an outer second portion 56 of pressure molded or injection molded thermoplastic material contacting the first portion with the two materials adhering to each other substantially over their entire contacting areas and if necessary bonded together. The article has a first end 58 defined by a neck region 60 with an opening 62 therein at the terminus thereof and generally with a threaded region 64 at the neck region. The article has a second end 66 defined by a bottom region 68 which is closed at the terminus thereof, and an intermediate body region 70 between the neck and bottom regions, with the body region connected to the neck region. As clearly shown in FIG. 8, the second or outer portion 56 covers the closed bottom and extends from the closed bottom to the open neck, while the inner or first portion 54 also covers the closed bottom and extends from the closed bottom to terminate below the neck region 60.

Figure 9:
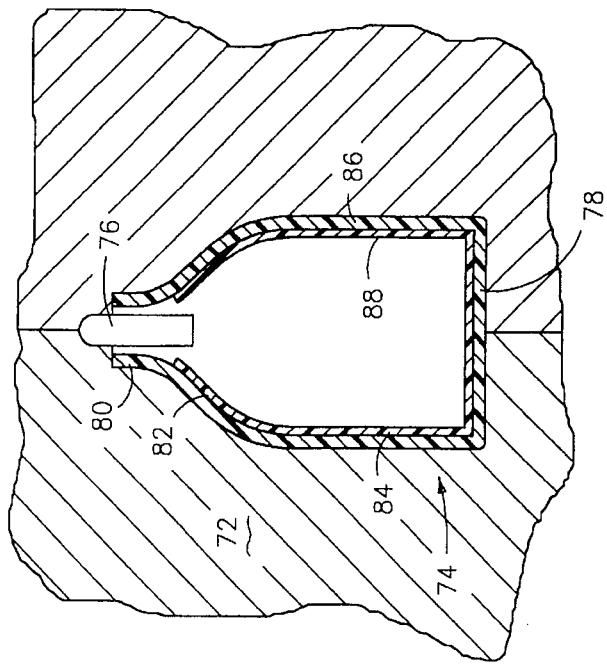
FIG. 9 is a side view of the article of FIG. 8 in a blow mold formed into a blow molded article.

In accordance with FIG. 9, one may form a blow molded article 74 from the injection molded article 52 as shown in blow mold 72 in FIG. 9 wherein article 74 is formed in blow mold 72 with blow core 76 therein to form the blow molded article in a conventional manner. Blow molded article 74 includes bottom region 78, neck region 80, shoulder region 82 and body region 84. These regions correspond generally to the regions in the injection molded article shown in FIG. 8. The article 74 also includes an outer pressure molded portion 86 and an inner film-like portion 88 corresponding to the outer and inner portions in the injection molded article shown in FIG. 8. The inner or liner material 88 extends from bottom region 78 to terminate below neck region 80 and may terminate adjacent neck region 80 or on shoulder region 82 as shown in FIG. 9.

One may utilize a wide variety of materials for the inner and outer layers. Naturally, the outer layer should be less expensive since it forms the major portion of the article, such as polyesters as polyethylene terephthalate, polyethylene, polystyrene, or other known materials. The inner or liner material should be a single gas barrier such as PEN or acrylonitrile (AN), or a laminate consisting of several layers, each the most desirable for a specific purpose, for example, a polyolefin for water vapor, EVOH or PEN for $O_2$ and $CO_2$, and PET for better bonding to the PET injected layer.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multilayered hollow plastic article which comprises: an inner first portion of a first thermoplastic layer; an outer second portion of a pressure molded second thermoplastic layer contacting the first portion, with the two layers being adhered to each other substantially over their entire contacting areas, with the inner first portion being thinner than the outer second portion; wherein said article has a first end defined by a neck region with an opening therein at the terminus thereof, a second end defined by a bottom region which is closed at the terminus thereof, and an intermediate body region between the neck and bottom regions with the body region connected to the neck region; and wherein the second portion covers the closed bottom and extends from the closed bottom to the open neck, and the first portion covers the closed bottom and extends from the closed bottom to terminate immediately below the neck portion, wherein the article has an inside and an outside face with the first portion defining the inside face of the body and bottom regions and the second portion defining the outside face of the body and bottom regions, and wherein the second portion defines inside and outside faces of the neck region, and including a plurality of discrete strips of the material of the first portion separated by material of the second portion, said discrete strips being located between the inside face of the article and the outside face of the article extending over the second portion and below the neck region.

2. An article according to claim 1 wherein the first portion extends from the closed bottom to the connection between the body and neck regions.

3. An article according to claim 1 wherein the second portion is polyethylene terephthalate.

4. An article according to claim 1 wherein the first portion is a barrier containing material selected from the group consisting of PVDC, PEN, AN and EVOH.

5. An article according to claim 1 wherein said article has a threaded neck region.

6. An article according to claim 1 wherein said article is a blow molded article.

7. An article according to claim 1, wherein said discrete strips extend essentially perpendicular to the inside face of the body region.

8. An article according to claim 1, including material of the first portion on the outside face of the article connected to said discrete strips.

9. An article according to claim 1, wherein said discrete strips extend laterally over the second portion between the inside and outside faces adjacent the neck region.

10. In a method of making a multilayered hollow plastic article of claim 1 wherein said article is formed in a mold around and in conformity with a core, with a preformed thermoplastic sleeve provided on said core, the improvement comprising: providing a thermoplastic sleeve of a first portion of a first thermoplastic material separably connected to a plate of said first thermoplastic material by discrete strips of said first thermoplastic material with spaces between said strips; placing said sleeve connected to said plate in an injection mold; and injecting a second portion of a second thermoplastic material into said injection mold so that the injected second portion forms the outside face of the bottom and body regions of the article, with the sleeve forming the inside face of the bottom and body regions; and with the injected second thermoplastic material passing through said spaces to form the inside and outside faces of the neck region of the article.

11. A method according to claim 10 wherein the sleeve is placed in the injection mold with the strips and open spaces therebetween extending across the injection mold.

12. A method according to claim 11 wherein said injection mold severs the sleeve from the plate.

13. A method according to claim 11 including the step of injecting said second portion of said second thermoplastic material into the injection mold to form said multilayered article, with said strips extending from the inside face of the article to the outside face of the article over the second portion at the connection between the body and neck regions of the article.

14. A method according to claim 10 including the step of forming a plurality of thermoplastic sleeves on a web, dividing said web into plates, and transferring said plates with sleeves thereon to an injection mold having a plurality of injection mold cavities for the formation of a plurality of said multilayered articles.

15. A method according to claim 10 including the step of transferring said multilayered article to a blow mold for the formation of an expanded multilayered article.

16. A method according to claim 14 including the step of providing an alignment means on said plate adapted to position said plate with respect to said injection molds.

17. A method according to claim 14 including the step of providing means on said plate to facilitate destacking a plurality of said plates.

18. A method according to claim 14 including the step of providing an alignment means on said plate adapted to position said plate with respect to said injection molds, and also including the step of providing means on said plate to facilitate destacking a plurality of said plates, wherein said alignment means contact with said destacking means.

19. A multilayered hollow plastic article which comprises: an inner first portion of a first thermoplastic layer integrally connected to a web of a second thermoplastic layer; an outer second portion of a pressure molded thermoplastic layer contacting the first portion, with the two layers being adhered to each other substantially over their entire contacting areas, with the inner first portion being thinner than the outer second portion; wherein said article has a first end defined by a neck region with an opening therein at the terminus thereof, a second end defined by a bottom region which is closed at the terminus thereof, and an intermediate body region between the neck and bottom regions with the body region connected to the neck region; and wherein the second portion covers the closed bottom and extends from the closed bottom to the open neck, and the first portion covers the closed bottom and extends from the closed bottom to terminate immediately below the neck portion.

20. An article according to claim 19 wherein the article has an inside and an outside face with the first portion defining the inside face of the body and bottom regions and the second portion defining the outside face of the body and bottom regions, and wherein the second portion defines inside and outside faces of the neck region.

21. An article according to claim 19, including a plurality of said articles connected to each other by said web.

22. An article according to claim 19, wherein said inner first portion is partially severed from said web.

23. An article according to claim 20, including a plurality of discrete strips of the material of the first portion separated by material of the second portion, said discrete strips being located between the inside face of the article and the outside face of the article extending over the second portion and below the neck region.

24. An article according to claim 23, wherein said discrete strips extend essentially perpendicular to the inside face of the body region.

\* \* \* \* \*